(12) United States Patent
Alexander et al.

(10) Patent No.: US 11,893,390 B2
(45) Date of Patent: Feb. 6, 2024

(54) METHOD OF DEBUGGING A PROCESSOR THAT EXECUTES VERTICES OF AN APPLICATION, EACH VERTEX BEING ASSIGNED TO A PROGRAMMING THREAD OF THE PROCESSOR

(71) Applicant: Graphcore Limited, Bristol (GB)

(72) Inventors: Alan Graham Alexander, Wotton-under-Edge (GB); Richard Luke Southwell Osborne, Bristol (GB); Matthew David Fyles, Wiltshire (GB)

(73) Assignee: GRAPHCORE LIMITED, Bristol (GB)

( * ) Notice: Subject to any disclaimer, the term of this patent is extended or adjusted under 35 U.S.C. 154(b) by 0 days.

(21) Appl. No.: 17/812,214

(22) Filed: Jul. 13, 2022

(65) Prior Publication Data

US 2022/0350610 A1 Nov. 3, 2022

Related U.S. Application Data

(63) Continuation of application No. 16/419,623, filed on May 22, 2019, now Pat. No. 11,416,258.

(30) Foreign Application Priority Data

Jan. 11, 2019 (GB) ..................................... 1900435

(51) Int. Cl.
*G06F 9/38* (2018.01)
(52) U.S. Cl.
CPC .......... *G06F 9/3861* (2013.01); *G06F 9/3851* (2013.01)

(58) Field of Classification Search
CPC ................. G06F 9/3861; G06F 9/3851; G06F 2209/481; G06F 9/4812; G06F 9/522;
(Continued)

(56) References Cited

U.S. PATENT DOCUMENTS 6,718,484 B1 4/2004 Kodera
7,100,021 B1 * 8/2006 Marshall ................... G06F 9/52
712/19
(Continued)

OTHER PUBLICATIONS

Liang, J. An Architecture and Compiler for Scalable On-Chip Communication. IEEE Transactions on VLSI Systems, vol. 12, No. 7, Jul. 2004, pp. 711-726, [retrieved on Jul. 27, 2020]. Retrieved from the Internet <URL: https://ieeexplore.ieee.org/stamp/stamp.jsp?tp=&arnumber=1308206 > <DOI: 10.1109/TVLSI.2004.830919>.*
(Continued)

*Primary Examiner* — Shawn Doman
(74) *Attorney, Agent, or Firm* — HAYNES AND BOONE, LLP

(57) ABSTRACT

A method for debugging a processor which is executing vertices of a software application is described. Each vertex is assigned to a programming thread of the processor. The processor has debug hardware for raising exceptions in certain break conditions. The method comprises inspecting a vertex identifier, comparing the vertex identifier and raising an instruction exception event for the programming thread if the vertex identifier assigned to the thread matches the vertex break identifier in the debug hardware. Exceptions are raised based on identified vertices, rather than just individual instructions or instruction addresses.

19 Claims, 8 Drawing Sheets

(58) Field of Classification Search
CPC .... G06F 9/4881; G06F 11/36; G06F 11/3648; G06F 11/0724; G06F 11/3632; G06F 11/3664
See application file for complete search history.

(56) References Cited

U.S. PATENT DOCUMENTS

| | | | |
|---|---|---|---|
| 2008/0115113 A1* | 5/2008 | Codrescu | G06F 11/362 714/E11.21 |
| 2011/0072309 A1 | 3/2011 | Sakai | |
| 2012/0144240 A1* | 6/2012 | Rentschler | G06F 11/3636 714/25 |
| 2012/0159258 A1 | 6/2012 | Maybee | |
| 2017/0091076 A1* | 3/2017 | Gao | G06F 11/3624 |
| 2018/0307985 A1* | 10/2018 | Appu | G06N 3/063 |
| 2019/0325075 A1* | 10/2019 | Hilloulin | G06F 16/2237 |
| 2020/0004602 A1* | 1/2020 | Pawlowski | G06F 9/30087 |

OTHER PUBLICATIONS

Combined Search and Examination Report for GB Patent Application No. GB1900435.7 dated Sep. 30, 2019.
Acar, Carnegie Mellon University, Course on Parallel Computing: Chapter: Multithreading, Parallelism, and Concurrency, 2016 (CSU) see "mulithreaded computation", fig 1, available from https://www.cs.cmu.ed/~15210/concurrency.html.

* cited by examiner

METHOD OF DEBUGGING A PROCESSOR THAT EXECUTES VERTICES OF AN APPLICATION, EACH VERTEX BEING ASSIGNED TO A PROGRAMMING THREAD OF THE PROCESSOR

CROSS-REFERENCE TO RELATED APPLICATIONS

This application is a continuation of U.S. patent application Ser. No. 16/419,623, filed May 22, 2019, which claims the priority benefit under 35 U.S.C. § 119 of United Kingdom Patent Application No. 1900435.7, filed Jan. 11, 2019, the entire contents of which are incorporated herein by reference.

TECHNICAL FIELD

The present disclosure relates to handling exceptions while processing workloads in a processor which is executing a machine learning application. Particularly but not exclusively the disclosure relates to bulk synchronous parallel (BSP) communication schemes whereby each of a group of processing threads must complete a compute phase before any of the processing threads in the group can proceed to an exchange phase.

BACKGROUND

A multi-threaded processor is a processor which is capable of executing multiple program threads alongside one another. One possible form of multi-threading is parallelism. That is, as well as multiple contexts, multiple execution pipelines are provided: i.e. a separate execution pipeline for each stream of instructions to be executed in parallel. However, this requires a great deal of duplication in terms of hardware.

Instead therefore, another form of multi-threaded processor employs concurrency rather than parallelism, whereby the threads share a common execution pipeline (or at least a common part of a pipeline) and different threads are interleaved through this same, shared execution pipeline. Performance of a multi-threaded processor may still be improved compared to no concurrency or parallelism, thanks to increased opportunities for hiding pipeline latency. Also, this approach does not require as much extra hardware dedicated to each thread as a fully parallel processor with multiple execution pipelines, and so does not incur so much extra silicon.

One form of parallelism can be achieved by means of a processor comprising an arrangement of multiple tiles on the same chip (i.e. same die), each tile comprising its own separate respective processing unit and memory (including program memory and data memory). Thus separate portions of program code can be run in parallel on different ones of the tiles. The tiles are connected together via an on-chip interconnect which enables the code run on the different tiles to communicate between tiles. In some cases the processing unit on each tile may itself run multiple concurrent threads on tile, each tile having its own respective set of contexts and corresponding pipeline as described above in order to support interleaving of multiple threads on the same tile through the same pipeline.

An example use of multi-threaded and/or multi-tiled processing is found in machine intelligence. As will be familiar to those skilled in the art of machine intelligence, a machine intelligence algorithm is based around performing iterative updates to a "knowledge model", which can be represented by a graph of multiple interconnected nodes (vertices). Each node (vertex) represents a function of its inputs. Some nodes receive the inputs to the graph and some receive inputs from one or more other nodes, whilst the output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations based on the input data, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

The implementation of each node will involve the processing of data, and the interconnections of the graph correspond to data to be exchanged between the nodes. Typically, at least some of the processing of each node can be carried out independently of some or all others of the nodes in the graph, and therefore large graphs expose great opportunities for concurrency and/or parallelism.

Particular challenges arise in the debugging of such processors.

SUMMARY

The following describes components of a processor having an architecture which has been developed to address issues arising in the computations involved in machine intelligence applications. The processor described herein may be used as a work accelerator, that is, it receives a workload from an application running on a host computer, the workload generally being in the form of very large data sets to be processed (such as the large experience data sets used by a machine intelligence algorithm to learn a knowledge model, or the data from which to perform a prediction or inference using a previously-learned knowledge model). An aim of the architecture presented herein is to process these very large amounts of data highly efficiently. The processor architecture is particularly suited for processing workloads involved in machine intelligence.

The present disclosure addresses challenges of inspecting/debugging tiles in a multi-tile, multi-threaded processor architecture which is executing a graph of a machine intelligence algorithm. While described in the context of a multi-tile, multi-threaded processor, the techniques used herein may also be adapted for use in a single tile, single thread processor.

The principles of the invention rest on allocating each vertex of the graph to a particular thread, and enabling debug by raising an instruction exception in that thread only when a vertex break identifier stored in debug hardware is matched with a vertex that is ready to be processed by a thread. The vertex break function can be set by an enable bit.

One aspect of the present invention provides a method of debugging a processor which is executing vertices of a software application, each vertex being assigned to a programming thread of the processor, the method comprising:
  inspecting a vertex identifier when it is allocated for execution by the thread;
  comparing the vertex identifier with a vertex break identifier held in debug hardware on the processor; and
  raising an instruction exception event for the programming thread if the vertex identifier assigned to the thread matches the vertex break identifier in the debug hardware.

In one embodiment, the method comprises setting an enable bit which in one state enables the raising of an instruction exception event only if the vertex identifier assigned to the thread matches the vertex break identifier, and in another state enables the raising of an instruction exception event for any vertex identifier assigned to the thread.

The method may comprise the step of writing the vertex break identifier into the debug hardware.

The processor may be configured to execute a plurality of worker threads in each of a plurality of time slots in a repeating sequence of inter-leaved time slots, with the program state of each of the worker threads being stored in a context register set associated with the worker thread wherein each contact register set stores the vertex identifier currently being executed by that worker thread.

Each worker thread may execute instructions in a codelet assigned to it which represents a vertex, the codelet executing to an exit state unless it is excepted. A worker thread which has raised an exception event may be debugged, while the other worker threads on the tile continue to execute to their respective exits.

In the above method a supervisor thread executed on the processor may manage the allocation of vertices to worker threads.

The method may be applied to the case where the software application is represented by a graph of interconnected vertices wherein the vertex break identifier which is written into the debug hardware comprises a vertex identifier of a particular selected vertex in the graph.

Alternatively or additionally, a random group of vertices may be selected and their vertex identifiers written as the vertex break identifiers in debug hardware for each of multiple processing units in a processor.

An instruction exception may be raised if there is a match between an executing instruction address and an instruction break address in the debug hardware.

The invention provides in another aspect a processor configured to execute vertices of a software application, each vertex assigned to a programming thread of the processor, the processor comprising:
  storage circuitry configured to hold for each programming thread a vertex identifier of a vertex allocated for execution to that programming thread;
  debug hardware configured to hold a vertex break identifiers; and
  a debug component configured to compare the vertex identifier with the vertex break identifier, and to raise an instruction exception event for the programming thread if the vertex identifier assigned to the thread matches the vertex break identifier in the debug hardware. The processor may comprise some hardware that is common to the multiple different threads (e.g. a common instruction memory, data memory and/or execution unit); but to support the multi-threading, the processor also comprises some dedicated hardware specific to each thread.

The dedicated hardware comprises at least a respective context register file for each of the number of threads that can be executed at once. A "context", when talking about multi-threaded processors, refers to the program state of a respective on of the threads being executed alongside one another (e.g. program counter value, status and current operand values). The context register file refers to the respective collection of registers for representing this program state of the respective thread. Registers in a register file are distinct from general purpose memory in that register addresses are fixed as bits in instruction words, whereas memory addresses can be computed by executing instructions. The registers of a given context typically comprise a respective program counter for the respective thread, and a respective set of operand registers for temporarily holding the data acted upon and output by the respective thread during the computations performed by that thread. In the present case, each context manages a vertex identifier, which identifies the vertex currently being processed. Each context may also have a respective status register for storing a status of the respective thread (e.g. whether it is paused or running). Thus each of the currently running threads has its own separate program counter, and optionally operand registers and status register(s).

In general, there may exist dependencies between the portions of a program running on different tiles. A technique is therefore required to prevent a piece of code on one tile running ahead of data upon which it is dependent being made available by another piece of code on another tile. There are a number of possible schemes for achieving this, but the scheme of interest herein is known as "bulk synchronous parallel" (BSP). According to BSP, each tile performs a compute phase and an exchange phase in an alternating cycle. During the compute phase each tile performs one or more computation tasks locally on tile, but does not communicate any results of its computations with any others of the tiles. In the exchange phase each tile is allowed to exchange one or more results of the computations from the preceding compute phase to and/or from one or more others of the tiles in the group, but does not yet proceed to the next compute phase. Further, according to the BSP principle, a barrier synchronization is placed at the juncture transitioning from the compute phase into the exchange phase, or transitioning from the exchange phase into the compute phase, or both. That is it say, either: (a) all tiles are required to complete their respective compute phases before any in the group is allowed to proceed to the next exchange phase, or (b) all tiles in the group are required to complete their respective exchange phases before any tile in the group is allowed to proceed to the next compute phase, or (c) both. The supervisor thread may execute a synchronisation instruction. The tile may be configured to wait for all of the worker threads to reach their respective exit points, and then to execute a request for synchronisation, whereby the tile is paused until a synchronisation acknowledgement signal is received. In some scenarios a tile performing computation may be allowed to communicate with other system resources such as a network card or storage disk, as long as no communication with other tiles in the group is involved. The complexities of debugging such a processor executing machine learning applications is even more of a challenge, which is addressed herein by excepting on particular vertices.

BRIEF DESCRIPTION OF THE DRAWINGS

To aid understanding of the present disclosure and to show how embodiments may be put into effect, reference is made by way of example to the accompanying drawings in which.

DETAILED DESCRIPTION OF EMBODIMENTS

The present disclosure addresses challenges of inspecting/debugging tiles in a multi-tile, multi-threaded processor architecture which is executing a graph of a machine intelligence algorithm. While described in the context of a multi-tile, multi-threaded processor, the techniques used herein may also be adapted for use in a single tile, single thread processor.

Figure 1:
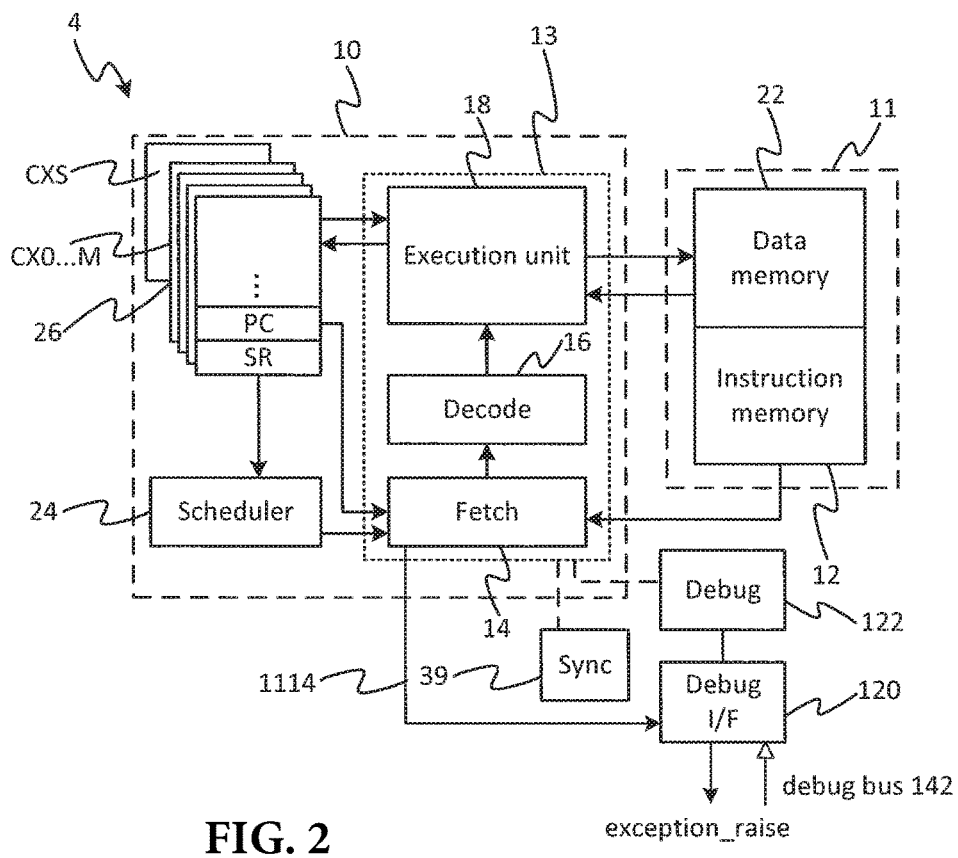
FIG. 1 is a schematic block diagram of a multi-threaded processing unit.

As discussed earlier, a machine intelligence graph is organised into functions, as explained in more detail below. Each node (or vertex) of the graph defines such a function. In any processor executing a machine intelligence graph, a high level of parallelism can be expected, with many vertices being executed at once, whether that is in a multi-tile processor, or with software interleaving multiple threads. It is extremely difficult to debug such arrangements. Embodiments of the present invention address that challenge by associating each individual thread with an address which denotes a vertex in the graph structure. As explained more fully herein, a status register 39 (FIG. 2) associated with each thread holds the vertex_base address. This address identifies the vertex in the graph which is currently being executed. The processor also has debug hardware 122 (FIG. 1) which includes a register 1107 (FIG. 4) for holding a vertex break address, which identifies a particular vertex for which instructions exceptions may be raised for debugging. According to a vertex break feature, when there is a match between the vertex address which is being executed by a thread, and the vertex address in the vertex break register in the debug hardware, instruction exception events may be raised as described in more detail herein which place the threat into a quiescent state so that it can be debugged.

Figure 11:
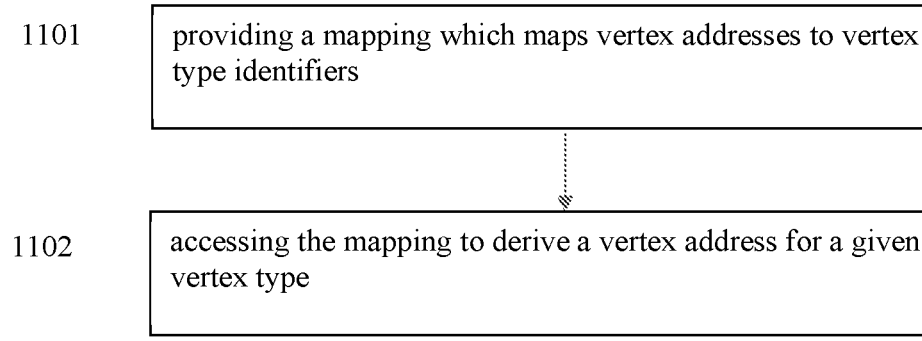
FIG. 11 is a drawing of a method.

Vertices may be of different types, and the type of a vertex may be defined by a type identifier associated with that vertex. In one particular application of a machine intelligence algorithm when organised into such a graph, there are 60 different types of vertices. There may be a vast number of vertices in the graph of each type. Some types may have tens of thousands of vertices, and other types may have up to 10 million vertices of that type. The hardware debug mechanism described herein enables debugging to be carried out on vertex addresses. In one embodiment, a software construct may be built to enable debugging on type identifiers, as illustrated in FIG. 11. For example, a mapping could be provided which maps vertex addresses to type identifiers (action 1101). To debug on a certain type identifier, the mapping is accessed to derive the vertex addresses of that type (action 1102).

While it would in theory be possible to investigate each vertex of such a large graph, the practical reality is that to do so would take more time than most debugging systems have available to them. Accordingly, the vertex break implementation in the debug hardware allows different debugging protocols to be implemented. According to one protocol, a particular individual vertex within the graph can be selected based on the vertex address (as mentioned earlier). According to another protocol, each of a random sample of vertex addresses can be recorded in the debug hardware of each respective tile in a multi-tile processor. While randomly inspecting vertices does not allow every vertex of the graph to be examined, it can give a good indication of which types of vertices are consistently failing and which may need debugging.

Figure 10:
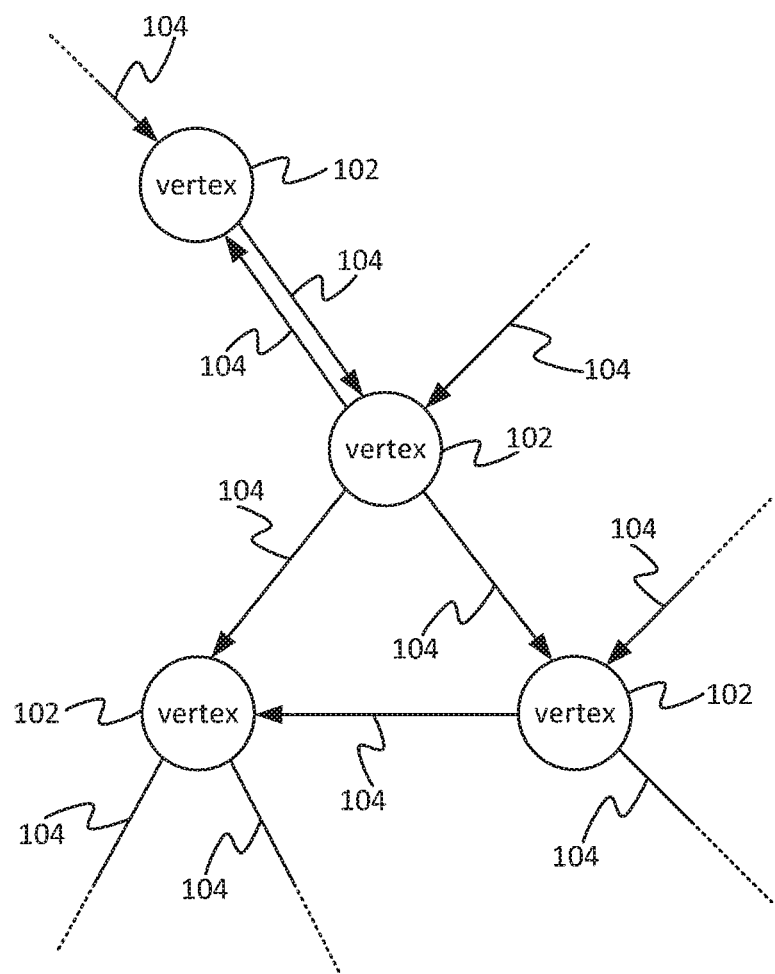
FIG. 10 is a schematic illustration of a graph used in a machine intelligence algorithm.

Aspects of the general concepts outlined above will now be described in more detail. FIG. 10 illustrates an example application of the processor architecture disclosed herein, namely an application to machine intelligence. It is noted that this is just one example of a context in which vertex debugging may be useful. In the following, nodes/vertices are defined in the context of machine learning, but the vertex debugging technique may be used in other scenarios. In general terms a vertex is a function which takes a set of inputs and produces a set of outputs. That function is fully programmable, and in the architecture described herein is implemented by a worker. The present description describes a fully programmable device than can run any application defined as a computational graph. The vertex breakpoint is a hardware feature to aid computational graph debugging of any kind, not just a machine intelligence application.

The reference to weights and edges in the following is given in the context of a machine learning example. There is no requirement for vertices to be operating on tensor data which holds the weights of a knowledge model—it equally may be any other type of application data. Furthermore, edge numbering 104, exit states and application operation such as convergence are not necessary to implement vertex breakpoints.

As will be familiar to a person skilled in the art of machine intelligence, machine intelligence begins with a learning stage where the machine intelligence algorithm learns a knowledge model. The model comprises a graph of interconnected nodes (i.e. vertices) 102 and edges (i.e. links) 104. Each node 102 in the graph has one or more input edges and one or more output edges. As already explained, and as known in the art, some of the input edges of some of the nodes 102 are the output edges of some others of the nodes, thereby connecting together the nodes to form the graph. Further, one or more of the input edges of one or more of the nodes 102 form the inputs to the graph as a whole, and one or more of the output edges of one or more of the nodes 102 form the outputs of the graph as a whole. Sometimes a given node may even have all of these: inputs to the graph, outputs from the graph and connections to other nodes. Each edge 104 communicates a value or more often a tensor (n-dimensional matrix), these forming the inputs and outputs provided to and from the nodes 102 on their input and output edges respectively.

Each node 102 represents a function of its one or more inputs as received on its input edge or edges, with the result of this function being the output(s) provided on the output edge or edges. Each function is parameterized by one or more respective parameters (sometimes referred to as weights, though they need not necessarily be multiplicative weights). In general the functions represented by the different nodes 102 may be different forms of function and/or may be parameterized by different parameters.

Further, each of the one or more parameters of each node's function is characterized by a respective error value. Moreover, a respective condition may be associated with the error(s) in the parameter(s) of each node 102. For a node 102 representing a function parameterized by a single parameter, the condition may be a simple threshold, i.e. the condition is satisfied if the error is within the specified threshold but not satisfied if the error is beyond the threshold. For a node 102 parameterized by more than one respective parameter, the condition for that node 102 having reached an acceptable level of error may be more complex. For example, the condition may be satisfied only if each of the parameters of that node 102 falls within respective threshold. As another example, a combined metric may be defined combining the errors in the different parameters for the same node 102, and the condition may be satisfied on condition that the value of the combined metric falls within a specified threshold, but otherwise the condition is not satisfied if the value of the combined metric is beyond the threshold (or vice versa depending on the definition of the metric). Whatever the condition, this gives a measure of whether the error in the parameter(s) of the node falls below a certain level or degree of acceptability. In general any suitable metric may be used. The condition or metric may be the same for all nodes, or different for different respective ones of the nodes.

In the learning stage the algorithm receives experience data, i.e. multiple data points representing different possible combinations of inputs to the graph. As more and more experience data is received, the algorithm gradually tunes the parameters of the various nodes 102 in the graph based on the experience data so as to try to minimize the errors in the parameters. The goal is to find values of the parameters such that the output of the graph is as close as possible to a desired output for a given input. As the graph as a whole tends toward such a state, the graph is said to converge. After a suitable degree of convergence the graph can then be used to perform predictions or inferences, i.e. to predict an outcome for some given input or infer a cause for some given output.

The learning stage can take a number of different possible forms. For instance, in a supervised approach, the input experience data takes the form of training data, i.e. inputs which correspond to known outputs. With each data point, the algorithm can tune the parameters such that the output more closely matches the known output for the given input. In the subsequent prediction stage, the graph can then be used to map an input query to an approximate predicted output (or vice versa if making an inference). Other approaches are also possible. For instance, in an unsupervised approach, there is no concept of a reference result per input datum, and instead the machine intelligence algorithm is left to identify its own structure in the output data. Or in a reinforcement approach, the algorithm tries out at least one possible output for each data point in the input experience data, and is told whether this output is positive or negative (and potentially a degree to which it is positive or negative), e.g. win or lose, or reward or punishment, or such like. Over many trials the algorithm can gradually tune the parameters of the graph to be able to predict inputs that will result in a positive outcome. The various approaches and algorithms for learning a graph will be known to a person skilled in the art of machine learning.

According to an exemplary application of the techniques disclosed herein, each worker thread is programmed to perform the computations associated with a respective individual one of the nodes 102 in a machine intelligence graph. In this case at least some of the edges 104 between nodes 102 correspond to the exchanges of data between threads, and some may involve exchanges between tiles in a multi-tile processor, described later. Furthermore, the individual exit states of the worker threads are used by the programmer to represent whether or not the respective node 102 has satisfied its respective condition for convergence of the parameter(s) of that node, i.e. has the error in the parameter or parameters fallen within the acceptable level or region in error space.

In the case of a multi-tile arrangement 6, each tile runs a subgraph of the graph. Each subgraph comprises a supervisor subprogram comprising one or more supervisor threads, and a set of worker threads in which some or all of the workers may take the form of codelets.

In such applications, or indeed any graph-based application where each worker thread is used to represent a respective node in a graph, the "codelet" comprised by each worker may be defined as a software procedure operating on the persistent state and the inputs and/outputs of one vertex, wherein the codelet:
  is launched on one worker thread register context, to run in one barrel slot (described later), by the supervisor thread executing a "RUN" instruction;
  runs to completion without communication with other codelets or the supervisor (except for the return to the supervisor when the codelet exits);
  has access to the persistent state of a vertex via a memory pointer provided by the "RUN" instruction, and to a non-persistent working area in memory which is private to that barrel slot; and
  executes "EXIT" as its last instruction, whereupon the barrel slot which it was using is returned to the supervisor.

To update a graph (or sub-graph) means to update each constituent vertex once, in any order consistent with the causality defined by the edges. To update a vertex means to run a codelet on the vertex state. A codelet is an update procedure for vertices—one codelet is usually associated with many vertices. There may be one codelet per vertex type. In some embodiments, a codelet may represent multiple types (which may be internally parametrised based on its input types) e.g. a half precision and single precision addition. The supervisor executes one RUN instruction per vertex, each such instruction specifying a vertex state address and a vertex base address which is used to launch a worker (in the form of a codelet).

The codelet is accessed from memory which may be on the local tile which executes the RUN instruction, but not necessarily. The vertex base address is matched with a break instruction BREAK ID for debugging. The BREAK ID is an address placed in a vertex break register as described later.

FIG. 1A illustrates an example of a processor module 4 in accordance with embodiments of the present disclosure. For instance the processor module 4 may be one tile of an array of like processor tiles on a same chip, or may be implemented as a stand-alone processor on its own chip. The processor module 4 comprises a multi-threaded processing unit 10 in the form of a barrel-threaded processing unit, and a local memory 11 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

The program described herein comprises a plurality of worker threads, and a supervisor subprogram which may be structured as one or more supervisor threads. These will be discussed in more detail shortly. In embodiments, each of some or all of the worker threads takes the form of a respective "codelet". A codelet is a particular type of thread, sometimes also referred to as an "atomic" thread. It has all the input information it needs to execute from the beginning of the thread (from the time of being launched), i.e. it does not take any input from any other part of the program or from memory after being launched. Further, no other part of the program will use any outputs (results) of the thread until it has terminated (finishes). Unless it encounters an error, it is guaranteed to finish. N.B. some literature also defines a codelet as being stateless, i.e. if run twice it could not inherit any information from its first run, but that additional definition is not adopted here. [Note also that not all of the worker threads need be codelets (atomic), and in embodiments some or all of the workers may instead be able to communicate with one another].

Within the processing unit 10, multiple different ones of the threads from the instruction memory 12 can be interleaved through a single execution pipeline 13 (though typically only a subset of the total threads stored in the instruction memory can be interleaved at any given point in the overall program). The multi-threaded processing unit 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register files 26 comprises a respective set of registers for representing the program state of a respective thread.

The tile also has a debug interface 120 and a set of debug hardware contexts 122 described later.

Figure 2:
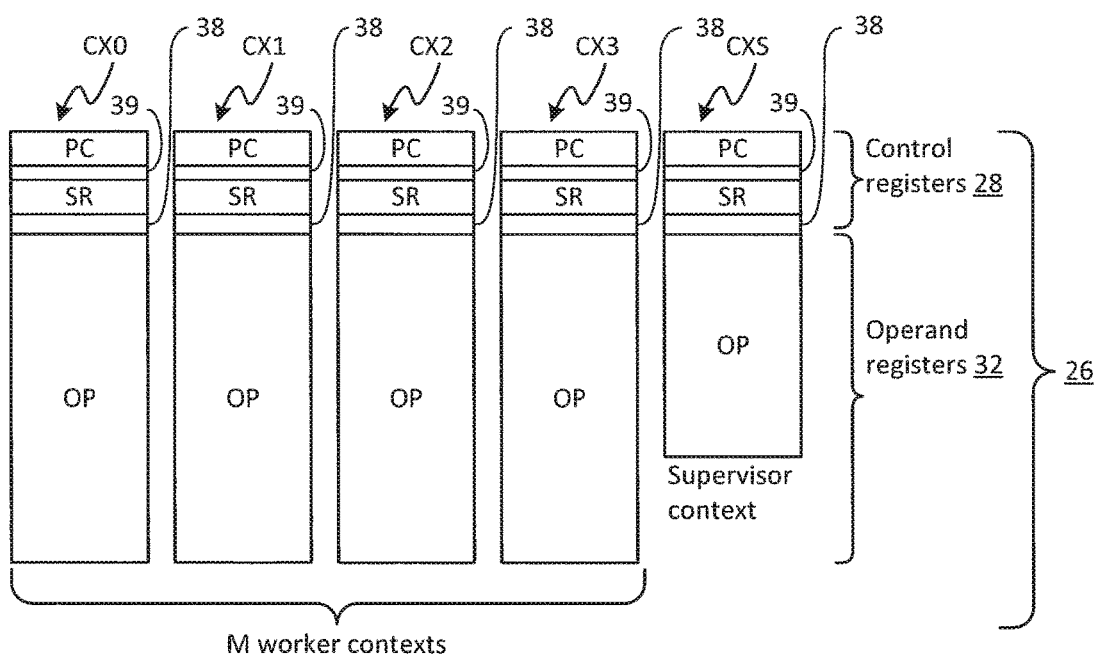
FIG. 2 is a schematic block diagram of a plurality of thread contexts.

An example of the registers making up each of the context register files 26 is illustrated schematically in FIG. 2. Each of the context register files 26 comprises a respective one or more control registers 28, comprising at least a program counter (PC) for the respective thread (for keeping track of the instruction address at which the thread is currently executing), and in embodiments also a set of one or more status registers (SR) recording a current status of the respective thread (such as whether it is currently running or paused, e.g. because it has encountered an exception event). Each of the context register files 26 also comprises a respective set of operand registers (OP) 32, for temporarily holding operands of the instructions executed by the respective thread, i.e. values operated upon or resulting from operations defined by the opcodes of the respective thread's instructions when executed. The context registers also comprise the vertex base register 39 for holding a vertex identifier (address of the executing thread), and an exception type register 38. It will be appreciated that each of the context register files 26 may optionally comprise a respective one or more other types of register (not shown). Note also that whilst the term "register file" is sometimes used to refer to a group of registers in a common address space, this does not necessarily have to be the case in the present disclosure and each of the hardware contexts 26 (each of the register sets 26 representing each context) may more generally comprise one or multiple such register files.

The disclosed arrangement has one worker context register file CX0 . . . CX(M–1) for each of the number M of threads that can be executed concurrently (M=3 in the example illustrated but this is not limiting), and one additional supervisor context register file CXS. The worker context register files are reserved for storing the contexts of worker threads, and the supervisor context register file is reserved for storing the context of a supervisor thread. Note that in embodiments the supervisor context is special, in that it has a different number of registers than each of the workers. Each of the worker contexts preferably have the same number of status registers and operand registers as one another. In embodiments the supervisor context may have fewer operand registers than each of the workers.

The fetch stage 14 is connected so as to fetch instructions to be executed from the instruction memory 12, under control of the scheduler 24. The scheduler 24 is configured to control the fetch stage 14 to fetch an instruction from each of a set of concurrently executing threads in turn in a repeating sequence of time slots, thus dividing the resources of the pipeline 13 into a plurality of temporally interleaved time slots, as will be discussed in more detail shortly. For example the scheduling scheme could be round-robin or weighted round-robin. Another term for a processor operating in such a manner is a barrel threaded processor.

In some embodiments, the scheduler 24 may have access to one of the status registers SR of each thread indicating whether the thread is paused, so that the scheduler 24 in fact controls the fetch stage 14 to fetch the instructions of only those of the threads that are currently active In embodiments, preferably each time slot (and corresponding context register file) is always owned by one thread or another, i.e. each slot is always occupied by some thread, and each slot is always included in the sequence of the scheduler 24; though the thread occupying any given slot may happen to be paused at the time, in which case when the sequence comes around to that slot, the instruction fetch for the respective thread is passed over.

The fetch stage 14 has access to the program counter (PC) of each of the contexts. For each respective thread, the fetch stage 14 fetches the next instruction of that thread from the next address in the program memory 12 as indicated by the program counter. The program counter increments each execution cycle unless branched by a branch instruction. The fetch stage 14 then passes the fetched instruction to the decode stage 16 to be decoded, and the decode stage 16 then passes an indication of the decoded instruction to the execution unit 18 along with the decoded addresses of any operand registers 32 specified in the instruction, in order for the instruction to be executed. The execution unit 18 has access to the operand registers 32 and the control registers 28, which it may use in executing the instruction based on the decoded register addresses, such as in the case of an arithmetic instruction (e.g. by adding, multiplying, subtracting or dividing the values in two operand registers and outputting the result to another operand register of the respective thread). Or if the instruction defines a memory access (load or store), the load/store logic of the execution unit 18 loads a value from the data memory into an operand register of the respective thread, or stores a value from an operand register of the respective thread into the data memory 22, in accordance with the instruction. Or if the instruction defines a branch or a status change, the execution unit changes value in the program counter PC or one of the status registers SR accordingly. Note that while one thread's instruction is being executed by the execution unit 18, an instruction from the thread in the next time slot in the interleaved sequence can be being decoded by the decode stage 16; and/or while one instruction is being decoded by the decode stage 16, the instruction from the thread in the next time slot after that can be being fetched by the fetch stage 14 (though in general the scope of the disclosure is not limited to one instruction per time slot, e.g. in alternative scenarios a batch of two or more instructions could be issued from a given thread per time slot). Thus the interleaving advantageously hides latency in the pipeline 13, in accordance with known barrel threaded processing techniques.

Figure 3:
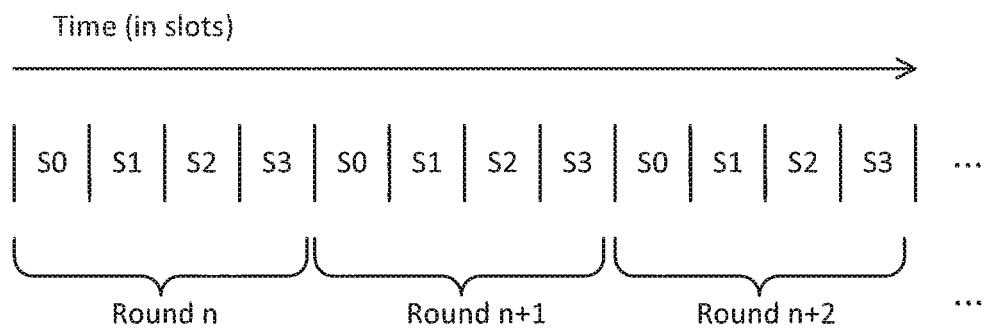
FIG. 3 schematically illustrates a scheme of interleaved execution time slots.

An example of the interleaving scheme implemented by the scheduler 24 is illustrated in FIG. 3. Here the concurrent threads are interleaved according to a round-robin scheme whereby, within each round of the scheme, the round is divided into a sequence of time slots S0, S1, S2 . . . , each for executing a respective thread. Typically each slot is one processor cycle long and the different slots are evenly sized, though not necessarily so in all possible embodiments, e.g. a weighted round-robin scheme is also possible whereby some threads get more cycles than others per execution round. In general the barrel-threading may employ either an even round-robin or a weighted round-robin schedule, where in the latter case the weighting may be fixed or adaptive.

This is illustrated by way of example in FIG. 2: if there are four time slots S0 . . . S3 as shown in FIG. 3, then there are five context register files, labelled here CX0, CX1, CX2, CX3 and CXS. That is, even though there are only four execution time slots S0 . . . S3 in the barrel-threaded scheme and so only four threads can be executed concurrently, it is disclosed herein to add a fifth context register file CXS, comprising a fifth program counter (PC), a fifth set of operand registers 32, and in embodiments also a fifth set of one or more status registers (SR). Though note that as mentioned, in embodiments the supervisor context may differ from the others CX0 . . . 3, and the supervisor thread may support a different set of instructions for operating the execution pipeline 13.

Each of the first four contexts CX0 . . . CX3 is used to represent the state of a respective one of the plurality of worker threads currently assigned to one of the four execution time slots S0 . . . S3, for performing whatever application-specific computation tasks are desired by the programmer (note again this may only be subset of the total number of worker threads of the program as stored in the instruction memory 12). The fifth context CXS however, is reserved, to represent the state of the supervisor thread (SV) whose role it is to coordinate the execution of the worker threads, at least in the sense of assigning which of the worker threads W is to be executed in which of the time slots S0, S1, S2 . . . at what point in the overall program. According to the present embodiments the supervisor thread has additional coordinating responsibilities. The supervisor thread is responsible for performing barrier synchronisations to ensure a certain order of execution. E.g. in a case where one or more second threads are dependent on data to be output by one or more first threads run on the same processor module 4, the supervisor may perform a barrier synchronization to ensure that none of the second threads begins until the first threads have finished. And/or, the supervisor may perform a barrier synchronization to ensure that one or more threads on the processor module 4 do not begin until a certain external source of data, such as another tile or processor chip, has completed the processing required to make that data available. The supervisor thread may also be used to perform other functionality relating to the multiple worker threads. For example, the supervisor thread may be responsible for communicating data externally to the processor module 4 (to receive external data to be acted on by one or more of the threads, and/or to transmit data output by one or more of the worker threads). In general the supervisor thread may be used to provide any kind of overseeing or coordinating function desired by the programmer. For instance as another example, the supervisor may oversee transfer between the tile local memory 12 and one or more resources in the wider system (external to the array 6) such as a storage disk or network card.

The supervisor thread SV does not have its own time slot per se in the scheme of interleaved time slots. Nor do the workers as allocation of slots to worker threads is flexibly defined. Rather, each time slot has its own dedicated context register file (CX0 . . . CXM−1) for storing worker context, which is used by the worker when the slot is allocated to the worker, but not used when the slot is allocated to the supervisor. When a given slot is allocated to the supervisor, that slot instead uses the context register file CVS of the supervisor. Note that the supervisor always has access to its own context and no workers are able to occupy the supervisor context register file CXS.

The supervisor thread SV has the ability to run in any and all of the time slots S0 . . . S3 (or more generally S0 . . . SM−1). The scheduler 24 is configured so as, when the program as a whole starts, to begin by allocating the supervisor thread to all of the time slots, i.e. so the supervisor SV starts out running in all of S0 . . . S3. However, the supervisor thread is provided with a mechanism for, at some subsequent point (either straight away or after performing one or more supervisor tasks), temporarily relinquishing each of the slots in which it is running to a respective one of the worker threads. This is achieved by the supervisor thread executing a relinquish instruction, called "RUN" by way of example herein. In embodiments this instruction takes two operands: an address of a worker thread in the instruction memory 12 and an address of some data for that worker thread in the data memory 22:

RUN task_addr, data_addr

The data address may specify some data to be acted upon by the worker thread. Alternatively, the relinquish instruction may take only a single operand specifying the address of the worker thread, and the data address could be included in the code of the worker thread; or in another example the single operand could point to a data structure specifying the addresses of the worker thread and data. The task_addr may be the vertex base address specifying the codelet for that vertex. As mentioned, in embodiments at least some of the workers may take the form of codelets, i.e. atomic units of concurrently executable code. [Alternatively or additionally, some of the workers need not be codelets and may instead be able to communicate with one another].

The relinquish instruction ("RUN") acts on the scheduler 24 so as to relinquish the current time slot, in which this instruction is itself executed, to the worker thread specified by the operand. Note that it is implicit in the relinquish instruction that it is the time slot in which this instruction is executed that is being relinquished (implicit in the context of machine code instructions means it doesn't need an operand to specify this—it is understood implicitly from the opcode itself). Thus the time slot which is given away is the time slot in which the supervisor executes the relinquish instruction. Or put another way, the supervisor is executing in the same space that that it gives away. The supervisor says "run this piece of code at this location", and then from that point onwards the recurring slot is owned (temporarily) by the relevant worker thread.

The supervisor thread SV performs a similar operation in each of one or more others of the time slots, to give away some or all of its time slots to different respective ones of the worker threads W0 . . . W3 (selected from a larger set W0 . . . wj in the instruction memory 12). Once it has done so for the last slot, the supervisor is suspended (then later will resume where it left off when one of the slots is handed back by a worker W).

The supervisor thread SV is thus able to allocate different worker threads, each performing one or more tasks, to different ones of the interleaved execution time slots S0 . . . S3. When the supervisor thread determines it is time to run a worker thread, it uses the relinquish instruction ("RUN") to allocates this worker to the time slot in which the RUN instruction was executed.

In some embodiments, the instruction set also comprises a variant of the run instruction, RUNALL ("run all"). This instruction is used to launch a set of more than one worker together, all executing the same code. In embodiments this launches a worker in every one of the processing unit's slots S0 . . . S3 (or more generally S0 . . . S(M−1)). The RUNALL instruction can thus be used to run the same vertex type multiple times.

Further, in some embodiments the RUN and/or RUNALL instruction, when executed, also automatically copies some status from one or more of the supervisor status registers CXS(SR) to a corresponding one or more status registers of the worker thread(s) launched by the RUN or RUNALL. For instance the copied status may comprise one or more modes, such as a floating point rounding mode (e.g. round to nearest or round to zero) and/or an overflow mode (e.g. saturate or use a separate value representing infinity). The copied status or mode then controls the worker in question to operate in accordance with the copied status or mode. In embodiments, the worker can later overwrite this in its own status register (but cannot change the supervisor's status). In further alternative or additional embodiments, that the workers can choose to read some status from one or more status registers of the supervisor (and again may change their own status later). E.g. again this could be to adopt a mode from the supervisor status register, such as a floating point mode or a rounding mode. In embodiments however, the supervisor cannot read any of the context registers CX0 . . . of the workers.

Once launched, each of the currently allocated worker threads W0 . . . W3 proceeds to perform the one or more computation tasks defined in the code specified by the respective relinquish instruction. At the end of this, the respective worker thread then hands the time slot in which it is running back to the supervisor thread. This is achieved by executing an exit instruction ("EXIT").

The EXIT instruction takes at least one operand and preferably only a single operand, exit_state (e.g. a binary value), to be used for any purpose desired by the programmer to indicate a state of the respective codelet upon ending (e.g. to indicate whether a certain condition was met):

EXIT exit_state

The EXIT instruction acts on the scheduler 24 so that the time slot in which it is executed is returned back to the supervisor thread. The supervisor thread can then perform one or more subsequent supervisor tasks (e.g. barrier synchronization and/or exchange of data with external resources such as other tiles), and/or continue to execute another relinquish instruction to allocate a new worker thread (W4, etc.) to the slot in question. Note again therefore that the total number of threads in the instruction memory 12 may be greater than the number that barrel-threaded processing unit 10 can interleave at any one time. It is the role of the supervisor thread SV to schedule which of the worker threads W0 . . . Wj from the instruction memory 12, at which stage in the overall program, are to be assigned to which of the interleaved time slots S0 . . . SM in the round robin schedule of the scheduler 24.

Figure 5:
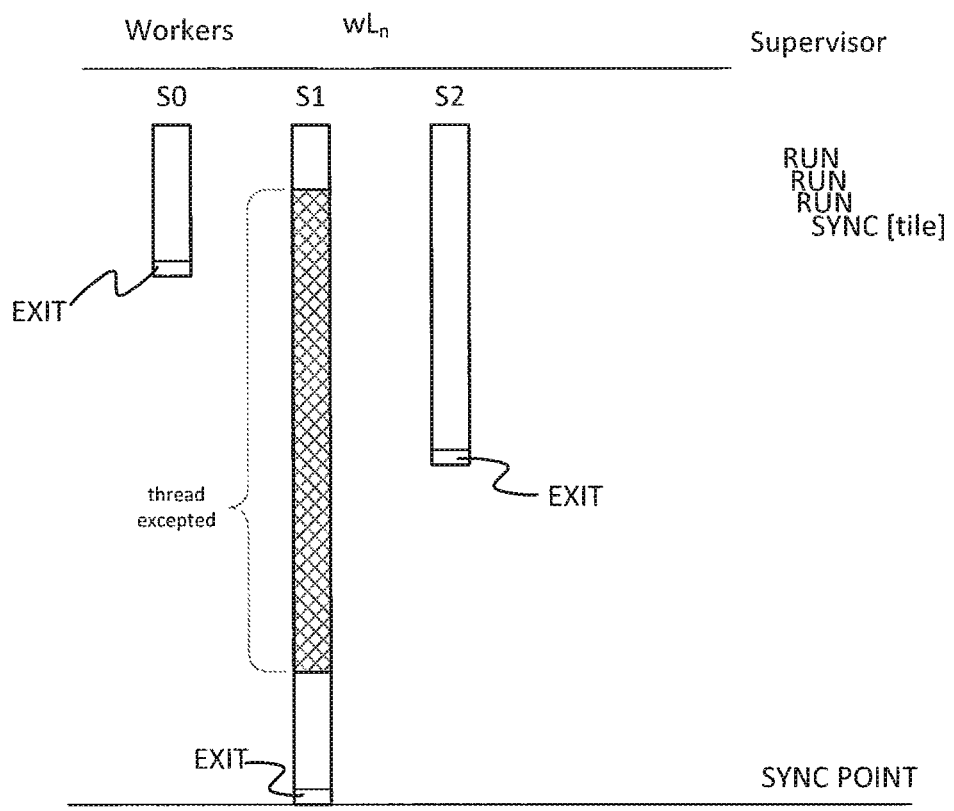
FIG. 5 schematically illustrates synchronization amongst worker threads on the same tile.

Referring to FIG. 5, in embodiments a SYNC (synchronization) instruction is provided in the processor's instruction set. The SYNC instruction has the effect of causing the supervisor thread SV to wait until all currently executing workers W have exited by means of an EXIT instruction. In embodiments the SYNC instruction takes a mode as an operand (in embodiments its only operand), the mode specifying whether the SYNC is to act only locally in relation to only those worker threads running locally on the same processor module 4, e.g. same tile, as the supervisor as part of which the SYNC is executed on (i.e. only threads through the same pipeline 13 of the same barrel-threaded processing unit 10); or whether instead it is to apply across multiple tiles or even across multiple chips.

SYNC mode // mode∈{tile, chip, zone_1, zone_2}

For the purposes of FIG. 5 a local SYNC will be assumed ("SYNC tile", i.e. a synchronization within a single tile).

The workers do not need to be identified as operands of the SYNC instruction, as it is implicit that the supervisor SV is then caused to automatically wait until none of the time slots S0, S1, . . . of the barrel-threaded processing unit 10 is occupied by a worker. As shown in FIG. 5, once each of a current batch of workers WLn have all been launched by the supervisor, the supervisor then executes a SYNC instruction. If the supervisor SV launches workers W in all the slots S0 . . . 3 of the barrel-threaded processing unit 10 (all four in the example illustrated, but that is just one example implementation), then the SYNC will be executed by the supervisor once the first of the current batch of worker threads WLn has exited, thus handing back control of at least one slot to the supervisor SV. Otherwise if the workers do not take up all of the slots, the SYNC will simply be executed immediately after the last thread of the current batch WLn has been launched. Either way, the SYNC causes the supervisor SV to wait for all others of the current batch of workers WLn to execute an EXIT before the supervisor can proceed. This waiting by the supervisor thread is imposed in hardware once the SYNC has been executed. I.e. in response to the opcode of the SYNC instruction, the logic in the execution unit (EXU) of the execution stage 18 causes the fetch stage 14 and scheduler 24 to pause from issuing instructions of the supervisor thread until all outstanding worker threads have executed an EXIT instruction.

The present application discusses exception handling within a computer of the type described herein. There are two situations in which exceptions can arise. One group of exceptions arise during normal operation, and another set of exceptions arise in the context of debugging. Exceptions can halt or suspend processing of a thread, and in the case of worker threads, this means they do not reach their EXIT information until the exception has been resolved. FIG. 5 illustrates, by crosshatching, that the worker executing in slot S1 has encountered an exception, and will not get to its EXIT instruction some time later than would be normal, after it has been debugged. One particular exception described herein is a vertex BREAK which enables instruction exceptions to be filtered based on vertex identifiers. The vertex identifiers may be the vertex base addresses. An instruction exception may only flag when a vertex identifier in the context register matches the vertex identifier in the debug vertex break register.

Exceptions indicate unusual and potentially problematic execution conditions, a divergence from the normal execution behaviour of a program. When in a debug mode, exceptions are deliberately created in order to allow a debugging process to be carried out. Whether or not the chip is in a debug mode, it is important to be able to ascertain the causes of exceptions, and in some cases to recover from such exceptions. The multithreaded BSP execution model discussed herein permits exceptions to be inspected, or debug to take place in one part of the computer, without interrupting normal operation in another part. For example, the exception handling mechanism discussed herein enables debug to be implemented on one thread or tile (or a set of threads/tiles) without the other threads/tiles on the same chip being aware that a debug process is in operation. For a chip with such a large number of tiles, this is an extremely valuable feature.

The tile debug hardware 120, 122 provides facilities for external agents such as a debug tool to sample the execution status of all contexts, held in the context status register.

One facility is to sample the current value of program count, in the program count register PC for a preconfigured context; Another facility is when a tile is quiescent, to interrogate and modify the architectural state of the tile.

Debug queries and commands are enacted by the manipulation of a small number of registers that are accessible via a system debug bus 142, using simple 32 bit read/write transactions. The tile debug interface registers comprise a context status register 1108 which can be read to ascertain the execution status of all tile contexts, a target debug interface control register and a vertex break register 1107 which holds an address for comparison against the current vertex_base value.

The debug hardware supports instruction break point channels. Each tile supports an implementation dependent number of instruction break point (IBRK channels). An instruction break point channel consists of the following architectural state:

a channel enable bit (not shown), with one enable bit per IBRK channel;
a channel control register (not shown) for setting break matching conditions; and
an address 1104 for making comparisons against instruction addresses.

The address in the vertex break register for making comparisons against the vertex_base value can be considered a part of an instruction break channel. It allows a vertex break mode where instruction breaks are only identified within certain vertices. Other vertices which may have the same instruction would not raise the exception.

Note that the latter address is valid for worker threads only.

When enabled, instruction break channels cause break exception events to be raised prior to the issue of the any solo instruction (or group of instructions) when the value of the program count matches the address for making a comparison against the instructions addresses.

Furthermore, the criteria specified by the instruction break channel configuration registers need to be met. If not match is detected, normal instruction execution ensues.

The instruction break channel configuration registers holds channel state which dictate the match criteria as follows.

An enable supervisor bit can either enable or disable instruction break matching for the supervisor context.

An enable worker bit can either enable or disable matching for worker contexts.

An enable vertex matching bit can be set to have one of two states. In the first state, all values of vertex_base are considered a match. In the second state, a hit will only occur when the value in the vertex base address register exactly matches vertex_base. Note that this is valid for worker contexts only. Break exception events triggered by the instruction break channel occur prior to instruction issue. The issuing of the instruction (or head instruction of a group of instructions) which triggered the break exception event will be stored until the exception event has been cleared.

The exception handling mechanism described herein permits one thread to encounter an exception without interrupting other threads on the same tile.

Characteristics of the exception handling mechanism discussed herein include the following.

Exceptions are specific to a particular context.
Exception causes are recorded within architectural state (an exception type register) and can be interrogated by external agents to ascertain the source of the exception. One such external agent may be a debug tool which can interrogate the state via the debug interface 120.
An exception may give rise to an exception event, depending on the nature of the exception. Exception events cause instruction issue of the excepting context to stall immediately following exception detection, and become visible at system and host and/or debug at level.

Moreover, exception events cause the system-wide barrier synchronisation mechanism to stall, either indefinitely, or until the exception has been recovered. In some embodiments, following an exception event anywhere in the system, all tiles will stall at the end of the current superstep.

Note, however, that the stall is accommodated by the BSP mechanism—threads and tiles other than the excepted one will progress to their next natural sync point, issue a sync request and then wait for a sync_ack. The sync_ack may take longer than if the exception had not occurred but there is no defined expected time so the system does not consider this to be outside normal operation. Note also that, other threads/tiles may take longer to get to their sync point in any event. The sync request and sync_ack are explained later.

Where possible, exception events are made recoverable, and in particular exception events raised by a debugging tool are recoverable by the following described mechanism.

The phases of the exception handling model will now be described.

A first phase is exception detection. Exception detection is performed by debug hardware 122 on each tile.

According to the next phase, exceptions are logged in context registers associated with the threads such that the state can later be interrogated to ascertain the cause of the exception.

Figure 4:
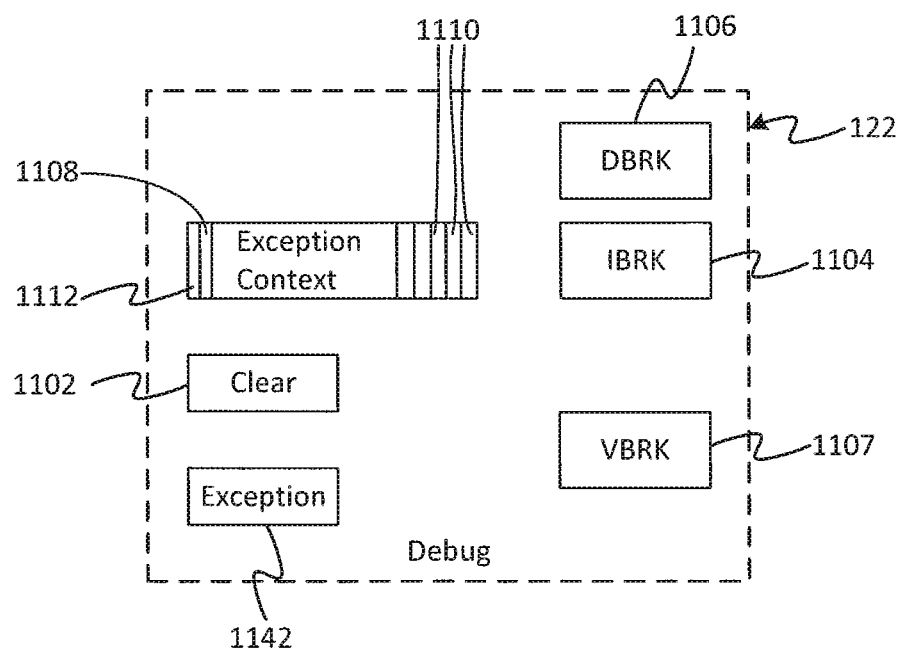
FIG. 4 shows more detail of debug circuitry.

Context Exception registers are denoted 38 in FIG. 2, and on is shown in each worker context and one for the supervisor context. Note that an exception is logged in two places. As shown in FIG. 4, the debug hardware 122 comprises an exception status register 1108 which holds a set of context entries. Each context entry indicates whether or not a particular context (worker or supervisor) has been excepted or not. The context entries 1110 may each be only a single bit to denote whether there has been an exception in the corresponding context. However, the context entries may have a greater number of bits, two or more, in which case the additional bit or bits may give some additional information about the nature of the exception. For example, they could indicate whether or not the exception is recoverable. The exception context register 1108 may have additional entries 1112 denoting for example different types of errors. For example, a memory error flag may be asserted if the particular exception relates to a parity or error check in the memory, since such errors are likely to fatally compromise operation. The exception status register 1108 enables a quick look up to be made when dealing with an exception raised by that tile. The debug handler tool only needs to further investigate context registers of contexts which are indicated as having been excepted. Note that the exception register 38 for each context may indicate the type of the exception e-type, in addition to an indication as to whether or not an exception should be raised.

That is, for certain exceptions, additional architectural state 1112 is modified to indicate the precise cause. These exceptions include instruction breaks and, instruction data breaks. It will readily be appreciated that other exceptions may be logged in the debug hardware.

For exceptions that do not give rise to an exception event, exception handling effectively terminates after the phases of exception detection and exception logging. For exceptions that do give rise to an exception event, the next phase is the raising of an exception event. Exception events occur whenever it is deemed necessary to halt or suspend the execution of a thread that caused an exception. One particular type of exception event discussed herein are break exceptions. Some of these (instruction breaks, instruction data breaks) are triggered by information held in the debug hardware 122.

The exception model discussed herein defines that break exceptions are recoverable. The system guarantees the ability to restart execution following a break exception event, without requiring a reset event. When a break occurs, architectural state indicating the cause of the break is accessible via a debug system. This architectural state may be in the exception register 38 of each context and/or in the exception status register 1108 in the debug hardware 122.

Exception events associated with break exceptions resulting from execution of a solo instruction or group of instructions are 'precise'. That is, the architectural state of the tile when the event is raised is consistent with that defined by the pre-commit phase of the instruction (or group of instructions) for which the exception was detected.

In the exception event raise phase, when an exception event occurs during the execution of any thread (supervisor or worker), then the instruction issue for this context is stalled. This means that the thread does not get to its normal endpoint (an EXIT instruction for workers or a SYNC instruction for the supervisor). This causes the system-wide synchronisation to stall. A tile output signal exception_raise 1114 is asserted. At this point, an exception event will be raised to the host and/or debug tool. However, all other threads continue execution as normal until they become quiescent. Note that the architecture described herein is of the type that the worker threads would in any event reach a state where they waited for a next compute phase to start following a synchronisation and exchange phase. Therefore normal operation of the processor (other than the excepted thread(s)) is not disturbed just because they may have to wait longer because one or more other threads have raised an exception. Moreover, regardless of the execution state of the other threads, the debug tool is able to interrogate the debug visible architectural state of the tile that it is currently dealing with. In particular, the debugger can ascertain the cause of the exception and can restart execution of the excepting thread. This is described in the exception recovery phase.

In the exception decode phase, architectural state in the exception context register 1108 and the exception registers 38 is interrogated to ascertain the cause of the exception.

In the exception recovery phase, there is a clearing down step. The final step in recovering from an exception event on a break is initiated by a write to a clear register 1102. There is one clear register per worker and one for the supervisor context. This write initiates a sequence of events which is dependent on the source of the exception event.

If the exception event was raised by a worker, the steps which are followed are dependent on the state of the supervisor.

If the supervisor is in a state in which it is still waiting for workers, the exception flag in the exception status register 1108 for the worker which raised the event is de-asserted and the worker will continue to execute. Instruction issue for that worker context is re-enabled. The instruction of the program count prior to the exception will be re-fetched and issued. No modification to the supervisor is made. The supervisor continues to wait for all workers to become inactive (reach their EXIT point) If the supervisor had also raised an exception the same sequence will be followed, except that subsequent exception events such as that raised by the supervisor context will now become visible outside the tile, due to the exception_raise signal. This is explained in more detail later.

If the supervisor was not waiting for workers, and had not raised an exception the same steps are followed, and the supervisor thread continues to run (either to wait for workers or execute its SYNC instruction).

If the current exception event was raised by the supervisor, its exception flag the exception status register 1108 is de-asserted and the supervisor resumes execution. The instruction at the program count prior to the exception is re-fetched and issued.

Architectural state is updated during the logging phase of an instruction break exception event, including recording the type of the exception in the worker status registers.

Clearing down an instruction break event allows the tile to continue execution of the program being debugged, following an instruction break triggered break exception event.

To clear down an instruction break exception event, the instruction break channel configuration is modified. For example, to disable it, the enable bit it set to 0.

The exception event is cleared on the appropriate context, and run mode can be set to executing.

The mechanism by which exceptions are handled on the chip will now be described with reference to FIGS. 2, 4 and 6.

Figure 6:
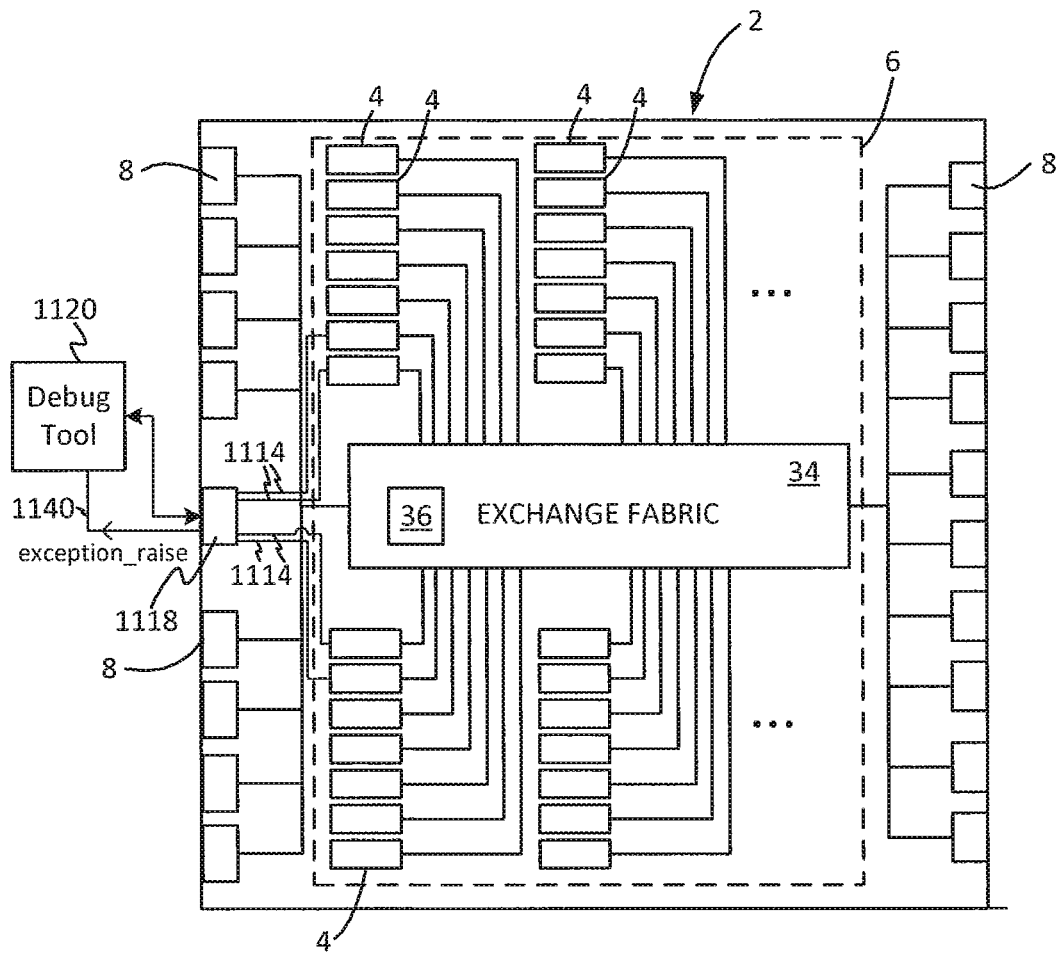
FIG. 6 is a schematic block diagram of a processor chip comprising multiple tiles.

FIG. 6 illustrates schematically the architecture of a computer comprising a plurality of tiles 4. Aspects of the computer shown in FIG. 6 are described in more detail later, but for the present time the debugging aspect will be described. As already mentioned, each tile has a debug interface 120 which allows access to the tile through a computer debug interface 1118 on the computer. A debug tool 1120 can access any tile via this computer debug interface 1118. Different mechanisms can be used to enable access by the tool to the tile, but the main function is a read from architectural state on the tile. As explained, each tile can issue an exception raised signal 1114. This is raised on a wire or set of wires which is connected from each individual tile to the debug interface 1118. There, a logic circuit which functions as an AND gate receives all of the exception raised wires and generates a global exception raised signal 1140 to the debug tool, the state of which depends on the state of the inputs to the logic. The logic is such that while any exception raised signal 1114 from an individual tile is active, the global exception raised signal 1140 will be active. When the global raised signal 1140 is active, the debug tool reads the exception status register in each tile to ascertain which tiles have raised an exception. The debug tool resolves an issue for a context and clears the exception for that context. If on the same tile another context has excepted, the tile exception raised signal will remain asserted. That is, once all the issues have been resolved on that tile, an exception flag 1142 in the debug hardware 122 is cleared and the exception raised signal is deasserted for that tile. In this way, each tile that has raised an exception raised signal, is dealt with in turn. The debug tool operates until the global exception raised signal 1140 is deasserted which indicates that each tile had caused an exception has now been dealt with. This indicates the end of that particular debug phase. As mentioned, while any individual tile is being subject to debug, the other tiles may continue to operate until they reach their own sync request point and are waiting for a sync acknowledgement. For tiles where a thread has been excepted, the particular thread may be debugged while the other threads continue to run to their own end point.

Note that when a worker context reaches a break point, it will effectively stall until the exception event is cleared, and it will not reach its exit state. However, other worker context on the same tile will be unaffected. The consequence of a worker being stalled (and not getting to its exit instruction) is that when the other workers have issued their exit states, the tile will fail to sync because one worker context will still be 'hanging' (see FIG. 5). However, individual threads and individual tiles can tolerate delays of this kind, because their operation is not dependent on completing programs within a certain time frame. Once the issue has been resolved, and the exception has been cleared normal operation is resumed.

Each tile also supports data breakpoint channels 1106. These are implemented as one or more register 1106 in the debug hardware which enable accesses to the tile memory to be detected. Data break channels cause break exception events to be raised if any memory class instruction has a behaviour which matches criteria specified by data break channel configuration registers. If no match is detected, normal instruction execution ensues. For example, data break registers may specify the start point of a contiguous address range, or specify a range size or a data value.

There follows a fuller explanation of a processor in which the exception handling mechanism may be implemented.

As mentioned, in embodiments the processor module 4 may be implemented as one of an array of interconnected tiles forming a multi-tile processor, wherein each of tile may be configured as described above in relation to FIGS. 1 to 5.

This is illustrated further in FIG. 6 which shows a single chip processor 2, i.e. a single die, comprising an array 6 of multiple processor tiles 4 and an on-chip interconnect 34 connecting between the tiles 4. The chip 2 may be implemented alone on its own single-chip integrated circuit package, or as one of multiple dies packaged in the same IC package. The on-chip interconnect may also be referred to herein as the "exchange fabric" 34 as it enables the tiles 4 to exchange data with one another. Each tile 4 comprises a respective instance of the barrel-threaded processing unit 10 and memory 11, each arranged as described above in relation to FIGS. 1 to 6. For instance, by way of illustration the chip 2 may comprise of the order of hundreds of tiles 4, or even over a thousand. For completeness, note also that an "array" as referred to herein does not necessarily imply any particular number of dimensions or physical layout of the tiles 4.

In embodiments each chip 2 also comprises one or more external links 8, enabling the chip 2 to be connected to one or more, external processors on different chips (e.g. one or more other instances of the same chip 2). These external links 8 may comprise any one or more of: one or more chip-to-host links for connecting the chip 2 to a host processor, and/or one or more chip-to-chip links for connecting together with one or more other instances of the chip 2 on the same IC package or card, or on different cards. In one example arrangement, the chip 2 receives work from a host processor (not shown) which is connected to the chip via one of the chip-to-host links in the form of input data to be processed by the chip 2. Multiple instances of the chip 2 can be connected together into cards by chip-to-chip links. Thus a host may access a computer which is architected as a single chip processor 2 or as multiple single chip processors 2 possibly arranged on multiple interconnected cards, depending on the workload required for the host application.

The interconnect 34 is configured to enable the different processor tiles 4 in the array 6 to communicate with one another on-chip 2. However, as well as there potentially being dependencies between threads on the same tile 4, there may also be dependencies between the portions of the program running on different tiles 4 in the array 6. A technique is therefore required to prevent a piece of code on one tile 4 running ahead of data upon which it is dependent being made available by another piece of code on another tile 4.

Figure 7:
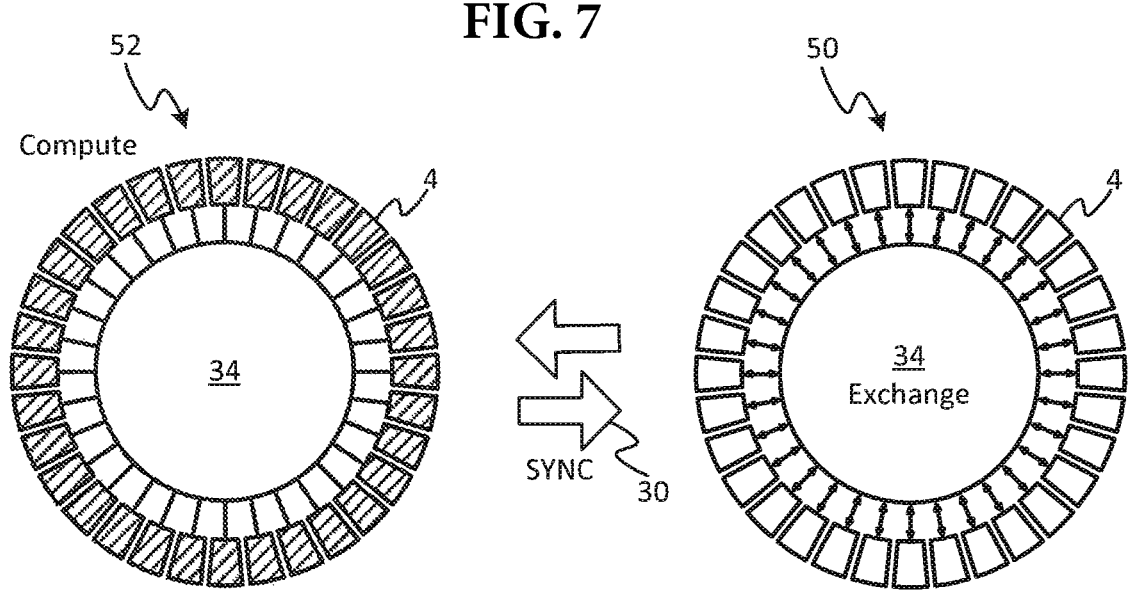
FIG. 7 is a schematic illustration of a bulk synchronous parallel (BSP) computing model.
Figure 8:
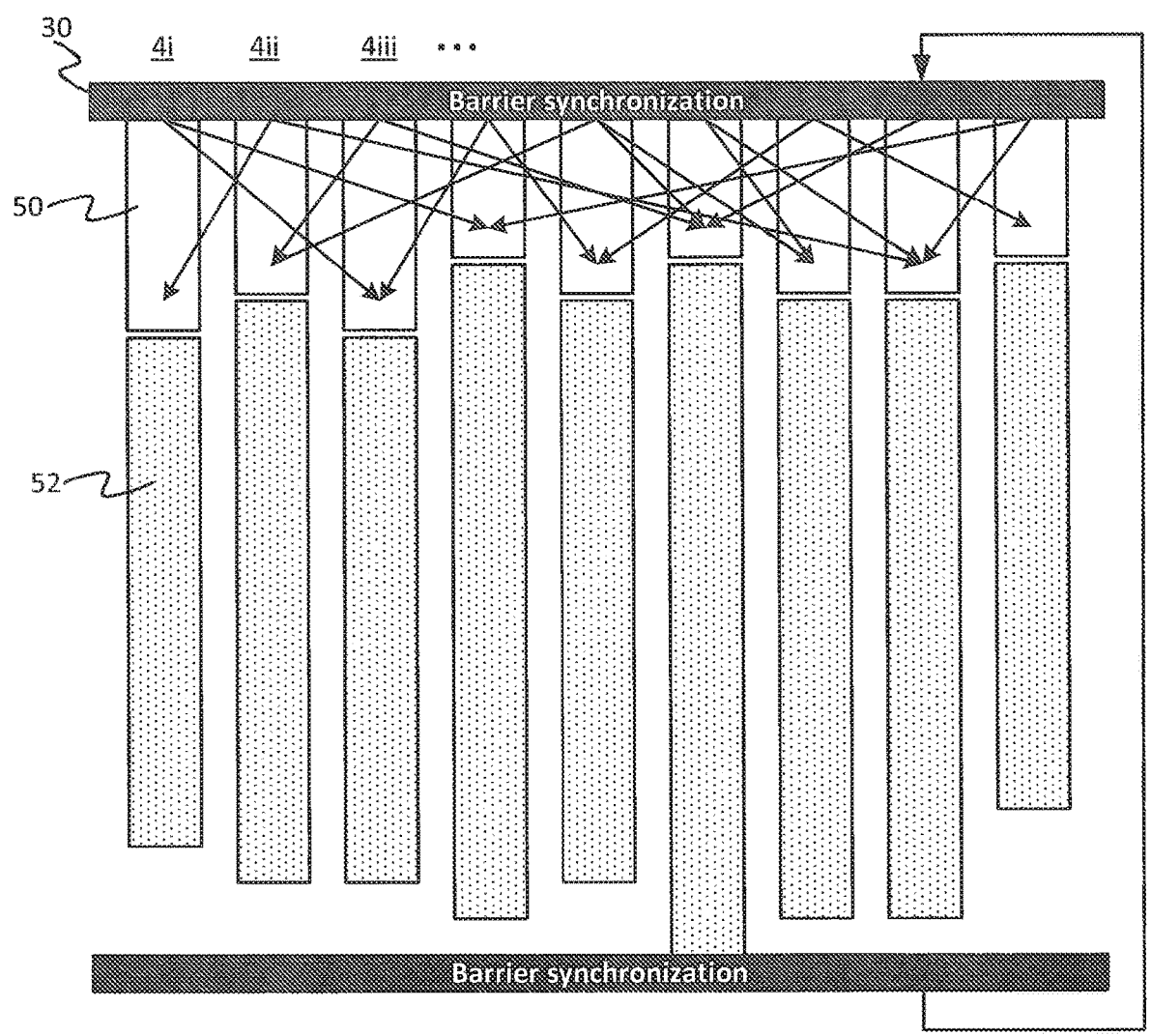
FIG. 8 is another schematic illustration of a BSP model.

In embodiments, this is achieved by implementing a bulk synchronous parallel (BSP) exchange scheme, as illustrated schematically in FIGS. 7 and 8.

According to one version of BSP, each tile 4 performs a compute phase 52 and an exchange phase 50 in an alternating cycle, separated from one to the other by a barrier synchronization between tiles. In the case illustrated a barrier synchronization is placed between each compute phase 52 and the following exchange phase 50. During the compute phase 52 each tile 4 performs one or more computation tasks locally on-tile, but does not communicate any results of these computations with any others of the tiles 4. In the exchange phase 50 each tile 4 is allowed to exchange one or more results of the computations from the preceding compute phase to and/or from one or more others of the tiles in the group, but does not perform any new computations until it has received from other tiles 4 any data on which its task(s) has/have dependency. It is not excluded that other operations such as internal control-related operations may be performed in the exchange phase. In embodiments the exchange phase 50 does not include any non-time-deterministic computations, but a small number of time-deterministic computations may optionally be allowed during the exchange phase 50. Note also that a tile 4 performing computation may be allowed during the compute phase 52 to communicate with other external system resources external to the array of tiles 4 being synchronized—e.g. a network card, disk drive, or field programmable gate array (FPGA)—as long as this does not involve communication with other tiles 4 within the group being synchronized. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phases 52 into the exchange phase 50, or the juncture transitioning from the exchange phases 50 into the compute phase 52, or both. That is to say, either: (a) all tiles 4 are required to complete their respective compute phases 52 before any in the group is allowed to proceed to the next exchange phase 50, or (b) all tiles 4 in the group are required to complete their respective exchange phases 50 before any tile in the group is allowed to proceed to the next compute phase 52, or (c) both of these conditions is enforced. In all three variants it is the individual processors which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

FIG. 8 illustrates the BSP principle as implemented amongst a group 4i, 4ii, 4iii of some or all of the tiles in the array 6, in the case which imposes: (a) a barrier synchronization from compute phase 52 to exchange phase 50 (see above). Note that in this arrangement, some tiles 4 are allowed to begin computing 52 whilst some others are still exchanging.

According to embodiments disclosed herein, this type of BSP may be facilitated by incorporating additional, special, dedicated functionality into a machine code instruction for performing barrier synchronization, i.e. the SYNC instruction.

In embodiments, the SYNC function takes this functionality when qualified by an inter-tile mode as an operand, e.g. the on-chip mode: SYNC chip.

The execution unit (EXU) of the execution stage 18 is configured so as, in response to the opcode of the SYNC instruction, when qualified by the on-chip (inter-tile) operand, to cause the supervisor thread in which the "SYNC chip" was executed to be paused until all the tiles 4 in the array 6 have finished running workers. This can be used to implement a barrier to the next BSP superstep. I.e. after all tiles 4 on the chip 2 have passed the barrier, the cross-tile program as a whole can progress to the next exchange phase 50.

Once the supervisor has launched (RUN) all of the threads which it intends to run in the current compute cycle 52, it then executes a SYNC instruction. This triggers the following functionality to be triggered in dedicated synchronization logic 39 on the tile 4, and in a synchronization controller 36 implemented in the hardware interconnect 34. This functionality of both the on-tile sync logic 39 and the synchronization controller 36 in the interconnect 34 is implemented in dedicated hardware circuitry such that, once the SYNC instruction is executed, the rest of the functionality proceeds without further instructions being executed to do so.

Firstly, the on-tile sync logic 39 causes the instruction issue for the supervisor on the tile 4 in question to automatically pause (causes the fetch stage 14 and scheduler 24 to suspend issuing instructions of the supervisor). Once all the outstanding worker threads on the local tile 4 have performed an EXIT, then depending on the status of the BREAK-on-Sync flag, the sync logic 39 sends a synchronization request "sync_req" to the synchronization controller 36 in the interconnect 34. The local tile 4 then continues to wait with the supervisor instruction issue paused. A similar process is also implemented on each of the other tiles 4 in the array 6 (each comprising its own instance of the sync logic 39). Thus at some point, once all the final workers in the current compute phase 52 have EXITed on all the tiles 4 in the array 6, the synchronization controller 36 will have received a respective synchronization request (sync_req) from all the tiles 4 in the array 6 that are not subject to an exception. The chip is 'paused' until exceptions have been cleared, and the sync_req issued from cleared tiles. Only then, in response to receiving the sync_req from every tile 4 in the array 6 on the same chip 2, the synchronization controller 36 sends a synchronization acknowledgement signal "sync_ack" back to the sync logic 39 on each of the tiles 4. Up until this point, each of the tiles 4 has had its supervisor instruction issue paused waiting for the synchronization acknowledgment signal (sync_ack). Upon receiving the sync_ack signal, the sync logic 39 in the tile 4 automatically unpauses the supervisor instruction issue for the respective supervisor thread on that tile 4. The supervisor is then free to proceed with exchanging data with other tiles 4 via the interconnect 34 in a subsequent exchange phase 50.

Preferably the sync_req and sync_ack signals are transmitted and received to and from the synchronization controller, respectively, via one or more dedicated sync wires connecting each tile 4 to the synchronization controller 36 in the interconnect 34.

Figure 9:
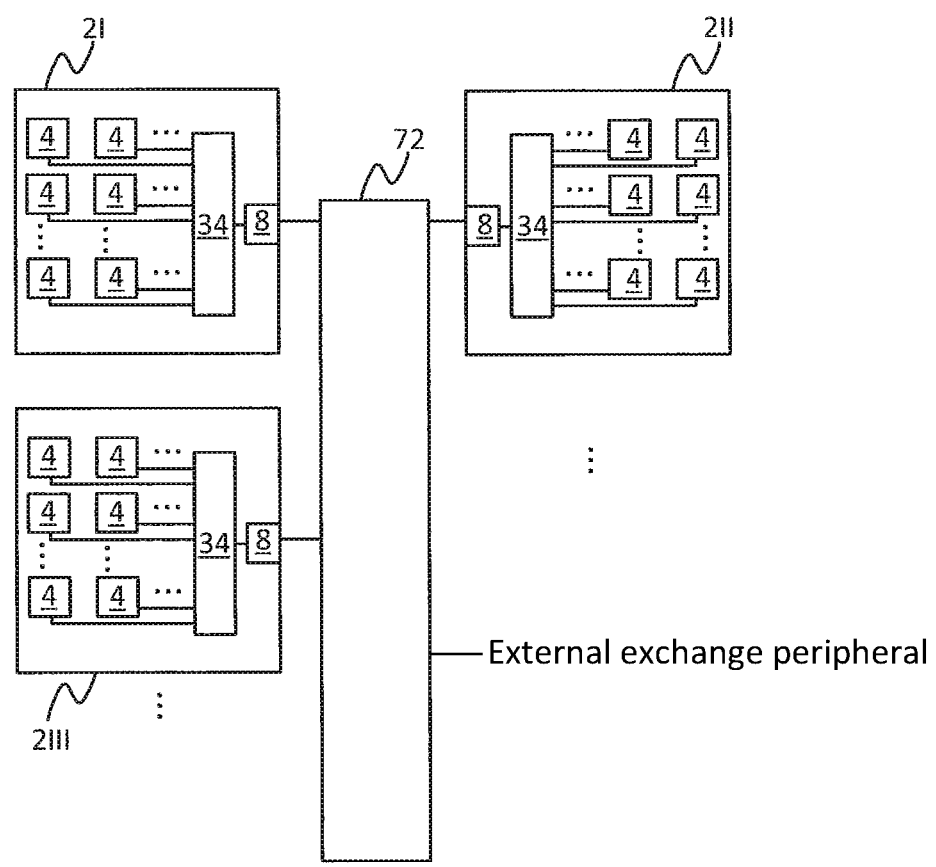
FIG. 9 is a schematic illustration of system of multiple interconnected processor chips.

As mentioned previously, in embodiments multiple instances of the chip 2 can be connected together to form an even larger array of tiles 4 spanning multiple chips 2. This is illustrated in FIG. 9. Some or all of the chips 2 may be implemented on the same IC package or some or all of the chips 2 may be implemented on different IC packages. The chips 2 are connected together by an external interconnect 72 (via the external links 8 shown in FIG. 7). As well as providing a conduit for exchange of data between tiles 4 on different chips, the external exchange peripheral 72 also provides hardware support for performing barrier synchronization between the tiles 4 on different chips 2.

In embodiments, the SYNC instruction can take at least one further possible value of its mode operand to specify an external, i.e. inter-chip, synchronization: SYNC zone_n, wherein zone_n represents an external sync zone. When the SYNC instruction is executed with an external sync zone of two or more chips 2 specified in its operand, this causes the logic in the external interconnect 72 to operate in a similar manner to that described in relation to the internal interconnect 34, but across the tiles 4 on the multiple different chips 2 in the specified sync zone.

That is, in response to an external SYNC, the supervisor instruction issue is paused until all tiles 4 on all chips 2 in the external sync zone have completed their compute phase 52 are not subject to an exception and submitted a sync request. Further, logic in the external interconnect 72 aggregates the local exit states of all these tiles 4, across the multiple chips 2 in the zone in question. Once all tiles 4 in the external sync zone have made the sync request, the external interconnect 72 signals a sync acknowledgment back to the tiles 4. In response to the sync acknowledgement, the tiles 4 on all the chips 2 in the zone resume instruction issue for the supervisor.

In embodiments the functionality of the interconnect 72 may be implemented in the chips 2, i.e. the logic may be distributed among the chips 2 such that only wired connections between chips are required (FIG. 9 is schematic).

All tiles 4 within the mentioned sync zone are programmed to indicate the same sync zone via the mode operand of their respective SYNC instructions. In embodiments the sync logic in the external interconnect 72 peripheral is configured such that, if this is not the case due to a programming error or other error (such as a memory parity error), then some or all tiles 4 will not receive an acknowledgement, and therefore that the system will come to a halt at the next external barrier, thus allowing a managing external CPU (e.g. the host) to intervene for debug or system recovery. In other embodiments an error is raised in the case where the sync zones don't match. Preferably however the compiler is configured to ensure the tiles in the same zone all indicate the same, correct sync zone at the relevant time.

It will be appreciated that the above embodiments have been described by way of example only.

Further, the terms "supervisor" and "worker" do not imply any specific responsibilities expect where otherwise explicitly stated, and particularly do not in themselves necessarily limit to the above-described scheme in which a supervisor thread relinquishes its time slot to a worker, and so forth. In general, worker thread may refer to any thread to which some computational task is allocated. The supervisor may represent any kind of overseeing or coordinating thread responsible for actions such as: assigning workers to barrel slots, and/or performing barrier synchronizations between multiple threads, and/or performing any control-flow operation (such as a branch) in dependence on the outcome of more than one thread.

Where reference is made to a sequence of interleaved time slots, or the like, this does not necessarily imply that the sequence referred to makes up all possible or available slots. For instance, the sequence in question could be all possible slots or only those currently active. It is not necessarily precluded that there may be other potential slots that are not currently included in the scheduled sequence.

The term tile as used herein does not necessarily limit to any particular topography or the like, and in general may refer to any modular unit of processing resource, comprising a processing unit 10 and corresponding memory 11, in an array of like modules, typically at least some of which are on the same chip (i.e. same die).

Other applications and variants of the disclosed techniques may become apparent to a person skilled in the art once given the disclosure herein. The scope of the present disclosure is not limited by the described embodiments but only by the accompanying claims.

The invention claimed is:

1. A method of debugging a processor while the processor executes vertices of a software application, each vertex being assigned to a respective programming thread of the processor, the method comprising:
   inspecting a vertex identifier of a first one of the vertices when the first one of the vertices is allocated for execution by a first one of the threads;
   comparing the vertex identifier with a vertex break identifier held in debug hardware on the processor;
   determining that there is a match between an executing instruction address of the first one of the threads and an instruction break address held in the debug hardware to identify an instruction exception;
   setting an enable bit which in one state enables raising an instruction exception event in response to the vertex identifier matching the vertex break identifier; and
   with the enable bit set in the one state, filtering the instruction exception based on the vertex identifier to prevent the instruction exception event from being raised in response to the vertex identifier not matching the vertex break identifier in the debug hardware, wherein setting the enable bit in another state enables raising the instruction exception event responsive to all vertex identifiers being considered a match.

2. The method of claim 1, wherein the vertex identifier is a vertex base address specifying a codelet in memory for the vertex.

3. The method of claim 1, further comprising writing the vertex break identifier into the debug hardware.

4. The method of claim 1, wherein the processor is configured to execute a plurality of worker threads in each of a plurality of time slots in a repeating sequence of inter-leaved time slots, with a program state of each of the worker threads being stored in a respective context register set associated with each of the worker threads wherein a first one of the context register sets stores the vertex identifier.

5. The method of claim 1, wherein a supervisor thread executed on the processor manages allocation of vertices to worker threads.

6. The method of claim 1, wherein the software application is represented by a graph of interconnected vertices, and the vertex break identifier comprises the vertex identifier.

7. The method of claim 1, further comprising selecting a random group of vertices and writing their vertex identifiers in the debug hardware for each of multiple processing units in the processor.

8. The method of claim 1, wherein the processor comprises an arrangement of tiles and an interconnect for communicating between tiles, wherein each tile comprises an execution unit for executing machine code instructions, and the interconnect is operable to conduct communications between a group of some or all of the tiles according to a bulk synchronous parallel scheme, whereby each of the tiles in the group performs an on-tile compute phase followed by an inter-tile exchange phase with the exchange phase being held back until all the tiles in the group have completed the compute phase.

9. The method of claim 1, wherein the processor comprises an arrangement of tiles and an interconnect for communicating between tiles;
   wherein each tile comprises an execution unit for executing machine code instructions, and the interconnect is operable to conduct communications between a group of some or all of the tiles according to a bulk synchronous parallel scheme, whereby each of the tiles in the group performs an on-tile compute phase followed by an inter-tile exchange phase with the exchange phase being held back until all the tiles in the group have completed the compute phase; and wherein the exchange phase is arranged to be performed by a supervisor thread.

10. The method of claim 1, wherein the processor is configured to execute a plurality of worker threads in each of a plurality of time slots in a repeating sequence of inter-leaved time slots, wherein each worker thread executes instructions in a codelet assigned to it which represents a respective vertex, the codelet executing to an exit state unless it is excepted.

11. The method of claim 1, wherein the processor is configured to execute a plurality of worker threads in each of a plurality of time slots in a repeating sequence of inter-leaved time slots, wherein each worker thread executes instructions in a codelet assigned to it which represents a respective vertex, the codelet executing to an exit state unless it is excepted, and wherein a supervisor thread executes a synchronisation instruction, and wherein a tile is configured to wait for all of the worker threads to reach their respective exit points, and then to execute a request for synchronisation, whereby the tile is paused until a synchronisation acknowledgement signal is received.

12. The method of claim 11, further comprising debugging a first worker thread which has raised an exception event, while other worker threads on the tile continue to execute to their respective exits.

13. The method of claim 1, comprising allocating a plurality of vertices of a graph of a machine learning application to a plurality of programming threads.

14. The method of claim 1, wherein the software application is a machine learning application.

15. The method of claim 1, wherein the software application comprises a plurality of vertex types, the method further comprising: providing a mapping which maps vertex addresses to vertex type identifiers; and accessing the mapping to derive a vertex address for a given vertex type.

16. A processor configured to execute vertices of a software application, each vertex assigned to a respective programming thread of the processor, the processor comprising:
    storage circuitry configured to hold for a first one of the programming threads a vertex identifier of a first one of the vertices allocated for execution to the first one of the programming threads;
    circuitry for allocating the first one of the programming threads to execution circuitry for execution;
    debug hardware configured to hold a vertex break identifier; and
    a debug component configured to:
        determine that there is a match between an executing instruction address of the first one of the threads and an instruction break address held in the debug hardware to identify an instruction exception;
        compare the vertex identifier with the vertex break identifier;
        prevent an instruction exception event being raised in response to: the vertex identifier not matching the vertex break identifier in the debug hardware and an enable bit being in a first state; and
        raise the instruction exception event in response to: all vertex identifiers being considered a match and the enable bit being in a second state.

17. The processor of claim 16, comprising an arrangement of tiles and an interconnect for communicating between tiles, wherein each tile comprises an execution unit for executing machine code instructions, and the interconnect is operable to conduct communications between a group of some or all of the tiles according to a bulk synchronous parallel scheme, whereby each of the tiles in the group performs an on-tile compute phase followed by an inter-tile exchange phase with the exchange phase being held back until all the tiles in the group have completed the compute phase.

18. The processor of claim 16, configured to execute a plurality of worker threads in each of a plurality of time slots in a repeating sequence of inter-leaved time slots, with a program state of each of the worker threads being stored in a respective context register set associated with each of the worker threads wherein a first one of the context register sets stores the vertex identifier.

19. The processor of claim 16, which is configured to execute a plurality of worker threads in each of a plurality of time slots in a repeating sequence of inter-leaved time slots, wherein each worker thread executes instructions in a codelet assigned to it which represents a respective vertex, the codelet executing to an exit state unless it is excepted, and wherein a supervisor thread executes a synchronisation instruction, and wherein a tile is configured to wait for all of the worker threads to reach their respective exit points, and then to execute a request for synchronisation, whereby the tile is paused until a synchronisation acknowledgement signal is received.

* * * * *